(12) United States Patent
Yoshigahara et al.

(10) Patent No.: US 10,059,083 B2
(45) Date of Patent: Aug. 28, 2018

(54) METHOD OF MANUFACTURING RESIN IMPREGNATED MATERIAL, COMPOSITE MATERIAL AND COPPER-CLAD LAMINATE

(71) Applicant: TATSUTA ELECTRIC WIRE & CABLE CO., LTD., Higashiosaka-shi, Osaka (JP)

(72) Inventors: Haruyuki Yoshigahara, Kizugawa (JP); Hiroaki Umeda, Kizugawa (JP); Masanori Miyamoto, Kizugawa (JP)

(73) Assignee: TATSUTA ELECTRIC WIRE & CABLE CO., LTD., Higashiosaka-shi (JP)

(*) Notice: Subject to any disclaimer, the term of this patent is extended or adjusted under 35 U.S.C. 154(b) by 0 days.

(21) Appl. No.: 15/557,943

(22) PCT Filed: Mar. 22, 2016

(86) PCT No.: PCT/JP2016/001652
§ 371 (c)(1),
(2) Date: Sep. 13, 2017

(87) PCT Pub. No.: WO2016/152149
PCT Pub. Date: Sep. 29, 2016

(65) Prior Publication Data
US 2018/0086025 A1  Mar. 29, 2018

(30) Foreign Application Priority Data

Mar. 23, 2015  (JP) .................................. 2015-059770

(51) Int. Cl.
*B32B 15/08* (2006.01)
*B32B 15/20* (2006.01)
(Continued)

(52) U.S. Cl.
CPC ............ *B32B 15/08* (2013.01); *B32B 15/085* (2013.01); *B32B 15/20* (2013.01); *B32B 27/281* (2013.01);
(Continued)

(58) Field of Classification Search
CPC ...... C08J 5/24; C08G 73/1007; C08L 79/085; B32B 2266/0235; B32B 2305/076; B32B 2457/08
See application file for complete search history.

(56) References Cited

U.S. PATENT DOCUMENTS 4,784,901 A     11/1988  Hatakeyama et al.
2004/0225026 A1* 11/2004  Mizori ............... C07D 207/452
                                                      522/99
(Continued)

FOREIGN PATENT DOCUMENTS

CN    102850726 A    1/2013
JP    2-20857 Y2     6/1990
(Continued)

OTHER PUBLICATIONS

Decision to Grant a Patent dated Sep. 12, 2016, issued in counterpart Japanese application No. 2016-547965, with English translation (6 pages).
(Continued)

*Primary Examiner* — Ramsey E Zacharia
(74) *Attorney, Agent, or Firm* — Westerman, Hattori, Daniels & Adrian, LLP

(57) ABSTRACT

The present invention provides a resin impregnated material and a composite material having excellent dielectric properties, high heat resistance, low stress property and the like at the same time, and a copper-clad laminate using the same. The resin impregnated material is formed by impregnating a
(Continued)

porous fluororesin with a curable resin composition containing: (A) a bismaleimide compound represented by General Formula (I); and (B) a radical polymerization initiator. In General Formula (I), X represents an aliphatic, alicyclic, or aromatic hydrocarbon group having 10 to 30 carbon atoms in the main chain; Y represents an aliphatic, alicyclic, or aromatic hydrocarbon group; and n represents a number in the range of 1 to 20.

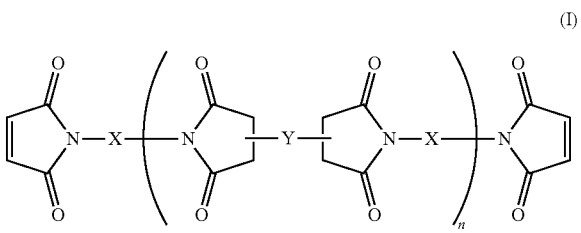

(I)

7 Claims, 1 Drawing Sheet

(51) Int. Cl.
| | |
|---|---|
| B32B 37/06 | (2006.01) |
| C08L 27/12 | (2006.01) |
| C08L 79/08 | (2006.01) |
| B32B 27/28 | (2006.01) |
| C08J 5/24 | (2006.01) |
| C08K 3/08 | (2006.01) |
| B32B 27/32 | (2006.01) |
| B32B 15/085 | (2006.01) |

(52) U.S. Cl.
CPC ............ *B32B 27/322* (2013.01); *B32B 37/06* (2013.01); *C08J 5/24* (2013.01); *C08K 3/08* (2013.01); *C08L 79/085* (2013.01); *B32B 2305/076* (2013.01); *B32B 2379/08* (2013.01); *B32B 2457/12* (2013.01); *C08K 2003/085* (2013.01)

(56) References Cited

U.S. PATENT DOCUMENTS

| | | |
|---|---|---|
| 2007/0049146 A1 | 3/2007 | Lee et al. |
| 2011/0049731 A1 | 3/2011 | Dershem et al. |

FOREIGN PATENT DOCUMENTS

| | | |
|---|---|---|
| JP | 2-268486 A | 11/1990 |
| JP | 2002-93945 A | 3/2002 |
| JP | 2006-63297 A | 3/2006 |
| JP | 2007-55054 A | 3/2007 |
| JP | 2012-1486 A | 1/2012 |
| JP | 2014-1289 A | 1/2014 |
| KR | 10-2012-0000074 A | 1/2012 |

OTHER PUBLICATIONS

International Search Report dated Jun. 14, 2016, issued in counterpart International Application No. PCT/JP2016/001652 (1 page).
Office Action dated Oct. 16, 2017, issued in counterpart Korean Application No. 10-2017-7024527, with English translation. (7 pages).
Office Action dated Apr. 17, 2018, issued in counterpart Chinese Application No. 201680016369.9, with partial English translation. (6 pages).

* cited by examiner

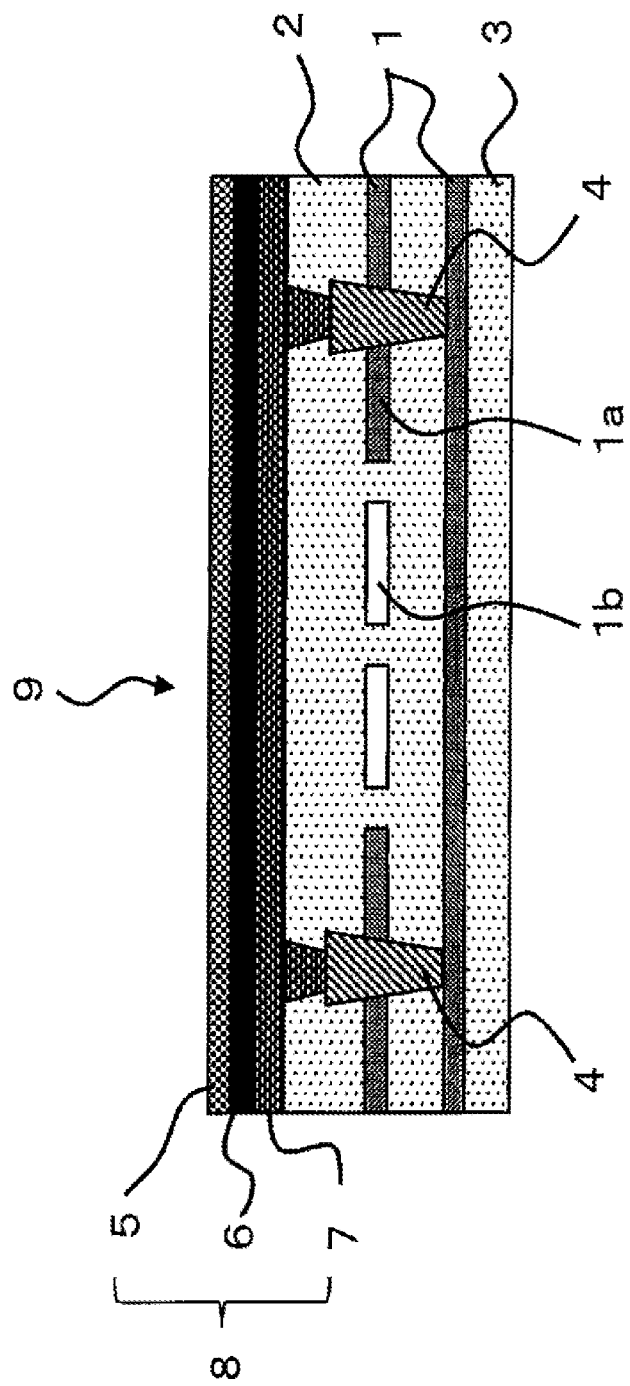

METHOD OF MANUFACTURING RESIN IMPREGNATED MATERIAL, COMPOSITE MATERIAL AND COPPER-CLAD LAMINATE

TECHNICAL FIELD

The present invention relates to a resin impregnated material that is made of a bismaleimide compound having a specific structure and a fluororesin, and that is suitable for use in an electronic circuit board or the like, a composite material obtained by curing the resin impregnated material, and a copper-clad laminate using the resin impregnated material.

BACKGROUND ART

A material of a printed wiring substrate for transmitting a high-frequency signal is required to have excellent dielectric properties in order to improve signal transmission characteristics. In recent years, for applications such as high-capacity communication equipment, a smartphone antenna module, a material for a cable system of a notebook personal computer, a material for millimeter wave radar, and car automatic brake system related equipment, demands for better dielectric properties, heat resistance, low stress, water resistance, adhesive property, and the like are increased for an electronic circuit board.

As an electronic circuit board in the related art, for example, a substrate is widely used that is obtained by curing a resin impregnated material which is obtained by impregnating glass fibers represented by frame retardant type 4 (FR4) or the like as a base material with a low dielectric constant epoxy resin as a matrix (PTL 1). However, the substrate does not lower the dielectric constant so much, and further improvement of the transmission characteristics of the signal is required.

In addition, a substrate having a low dielectric constant fluorine-based resin as a matrix dielectric layer is proposed (PTL 2), but it is known that the substrate has problems in adhesive property between the fluorine-based resin and the glass cloth layer, and in adhesive property to the copper foil.

In addition, a substrate using a fluororesin such as polytetrafluoroethylene (PTFE) or the like as a base material instead of glass fibers, and an epoxy resin as a matrix is proposed (PTL 3). Since PTFE has an excellent balance between dielectric properties and heat resistance, PTFE is widely used for circuit boards, or the like in high-frequency fields including this field. Moreover, PTFE also can withstand processes such as a solder reflow furnace so that these substrates have excellent dielectric properties to some extent, and are used, for example, for a circuit board of a large computer, or the like. Specifically, in a case where expanded porous PTFE (expanded PTFE or ePTFE) serving as a porous film of PTFE is used, adhesive property to epoxy resin is not high, but when impregnated with an epoxy resin forming a hard cured product, an integrated state in which the epoxy resin sufficiently wraps around to the inside of the porous film is obtained. Therefore, a substrate material having excellent dielectric properties to some extent can be obtained due to combination effect of both.

However, if even a slight detachment occurs between the expanded porous PTFE and the epoxy resin due to impact of earthquakes, drops, and the like regardless of the magnitude during the manufacturing process and actual use, a risk that reliability is lowered over time due to the influence of humidity, or the like, may happen as a great weak point so that it is not widely used for a circuit board of a mobile phone.

A liquid crystal polymer (hereinafter, referred to as "LCP" in some cases) is used as another material excellent in dielectric properties in the related art. However, LCP having heat resistance enough to withstand the solder reflow process at approximately 260° C. requires treatment at a temperature around 300° C. or higher, which causes a problem of extremely poor processability. In addition, in the final stage of the manufacture of the printed circuit board, in a case where a defect is found in the obtained product even if the defect is small, although the product is heated for a short time to approximately 400° C. locally with manual soldering, there is also a problem that it is impossible to correct a wiring board using LCP with manual soldering due to a heat resistance problem. In addition, LCP has poor adhesion to copper foil, so when laminating the LCP and the copper foil, in order to obtain sufficient adhesion, it is necessary to previously form a relatively large uneven shape on the surface of the copper foil, and to heat and press the same to laminate to the smooth surface of the LCP. However, when the uneven shape increases, the transmission distance of the signal increases, which causes a problem that transmission loss occurs. That is, although the LCP has excellent dielectric properties than the epoxy resin, it has problems to be solved as a substrate material for high-frequency signal circuits.

In addition, a maleimide compound such as a bismaleimide compound (hereinafter, referred to as "BMI" in some cases) is known to have high heat resistance, and in recent years the appearance of compounds having excellent dielectric properties is known (PTLs 4 to 6).

However, even if the bismaleimide compound is a bismaleimide compound having relatively excellent dielectric properties as described above, the strength of the bismaleimide compound itself is insufficient for application to the above applications. On the other hand, when combined with glass fibers in order to increase the strength of the bismaleimide compound, although the strength is increased, the dielectric properties are lowered, therefore there is a problem that the dielectric properties of the bismaleimide compound are canceled out.

In addition, it is proposed to prepare a substrate material using a known bismaleimide compound, and tetrafluoroethylene is mentioned as one of the options of the base material, but in the expressions that prepreg can be produced by combining a bismaleimide compound and a woven fabric or nonwoven fabric, PTFE is only included as an example of woven fabric or nonwoven fabric material, which is different from the gist of the present invention (PTL 7).

In addition, the resin impregnated material used for the substrate and the composite serving as the cured product thereof can be applied to applications other than the substrate, for example, these can be used for a structure such as a radome used for protecting a radar antenna for aircraft control from wind and rain. Materials constituting the radome are required to have low dielectric properties so that the strength does not decrease when the radar wave passes through the radome. As such a material, a fluorine-based resin having a low dielectric constant is used, and the above polytetrafluoroethylene (PTFE) is used in this field.

However, the strength of the fluorine-based resin itself is not high, and further, in order to obtain a thin sheet using the PTFE resin, it is necessary to manufacture the thin sheet by thinly slicing a hard massive PTFE resin, and user-friendly sheets that are flexible, thin, cloth-like, and durable have not been obtained until now.

CITATION LIST

Patent Literature

[PTL 1] JP-A-2006-63297
[PTL 2] JP-A-2007-55054
[PTL 3] JP-A-2-268486
[PTL 4] JP-A-2002-93945
[PTL 5] US Patent Application No. 2011/0049731
[PTL 6] JP-A-2014-1289
[PTL 7] JP-A-2012-1486

SUMMARY OF INVENTION

Technical Problem

As described above, there is a growing need for a substrate material that achieves both excellent characteristics in a high-frequency field and strength, but a resin impregnated material and a cured product thereof which combine all the diverse requirements in a balanced manner are not yet obtained.

The present invention has been made in view of the above problems, and an object thereof is to provide a composite material and copper-clad laminate using the same with multiple advantages such as excellent impact resistance and high adhesion to copper foil, low frequency and temperature dependence of the dielectric loss and the dielectric constant, and no deterioration of mechanical strength and the like when returning to normal temperature even if exposed to high temperature in processes such as solder reflow furnace.

Solution to Problem

The inventors of the present invention have found that in a case where a bismaleimide compound having a specific structure is combined with a fluororesin, particularly a porous fluororesin, an extremely highly reliable bonding with a fluororesin material which has been considered impossible until now can be realized due to the flexibility and high adhesive strength of the bismaleimide compound, while taking advantage of both excellent dielectric properties and heat resistance of these materials. Furthermore, the inventors have found that a composite material having excellent dielectric properties, insulating properties, heat resistance, low-stress property, water resistance, repairability of a cured product, and the like can be obtained, and the present invention has been completed.

That is, a resin impregnated material of the present invention is a resin impregnated material obtained by impregnating a base material with a curable resin composition, and in order to solve the problem described above, the curable resin composition contains a bismaleimide compound (A) represented by General Formula (I) and a radical polymerization initiator (B), and the base material is made of a porous fluororesin.

[chemical formula 1]

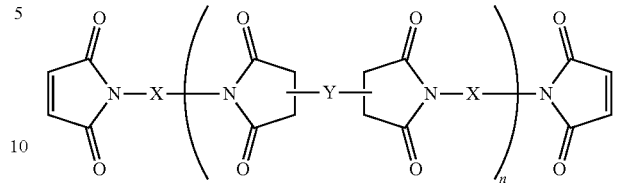

(I)

In Formula (I), X represents an aliphatic, alicyclic, or aromatic hydrocarbon group having 10 to 30 carbon atoms in the main chain, and these groups may have a hetero atom, a substituent, or a siloxane skeleton, Y represents an aliphatic, alicyclic, or aromatic hydrocarbon group, and these groups may have a hetero atom, a substituent, a phenyl ether skeleton, a sulfonyl skeleton, or a siloxane skeleton, and n represents a number in the range of 1 to 20.

In the resin impregnated material of the present invention, in the bismaleimide compound represented by General Formula (I), X in General Formula (I) has an alkyl group having 10 to 30 carbon atoms as a main chain, and two side chains bonded to mutually adjacent carbons in the alkyl group partially form a cyclic structure.

In addition, the bismaleimide compound represented by General Formula (I) may be a mixture of compounds in which n in General Formula (I) is any number in the range of 1 to 20, and a proportion of a compound in which n is 0 in the mixture may be 5% to 30%.

As the above radical polymerization initiator (B), one or two or more selected from a peroxide-based polymerization initiator, a diazo-based polymerization initiator, an alkylphenone-based polymerization initiator, an acylphosphine-based polymerization initiator, a titanocene-based polymerization initiator, and an oxime ester-based polymerization initiator may be used.

The content ratio of the porous fluororesin in the above resin impregnated material may be 20 to 90% by mass.

In addition, a composite material of the present invention contains a polymer of a bismaleimide compound represented by General Formula (I) and a porous fluororesin. The bismaleimide compound represented by General Formula (I) is a mixture of compounds in which n in General Formula (I) is any number in the range of 1 to 20, and it is preferable that a proportion of a compound in which n is 0 in the mixture is 5% to 30%.

The content ratio of the porous fluororesin in the above composite may be 20 to 90% by mass.

A copper-clad laminate of the present invention is formed by laminating the above composite material of the present invention and copper foil.

In addition, a method of manufacturing a copper-clad laminate of the present invention includes a step of semi-curing the resin impregnated material of the present invention to B stage state, a step of obtaining a semi-cured laminate by laminating the semi-cured resin impregnated material and copper foil, and a step of curing the semi-cured laminate by heating and/or energy ray irradiation to obtain the copper-clad laminate.

Advantageous Effects of Invention

According to the resin impregnated material and the composite material of the present invention, the composite material having both extremely excellent dielectric properties and adhesive property to copper foil or the like which was difficult to coexist in the related art can be obtained.

That is, since the specific bismaleimide compound is a thermosetting resin composition with excellent flexibility and adhesive bonding force, the resin impregnated material and the composite material of the present invention are excellent not only in dielectric properties but also in impact resistance and adhesion to copper foil or the like. Accordingly, the resin impregnated material and the composite material of the present invention can have high reliability and can further combine all of the high insulating property, high heat resistance, low-stress property, moisture resistance, water resistance, repairability (described later), and the like at the same time, which makes the resin impregnated material and the composite material of the present invention suitable for using as an electronic circuit board.

In the electronic circuit board using the LCP in the related art, the surface of the copper foil needs to have an uneven shape in order to improve the adhesive property to the copper foil. On the contrary, the resin impregnated material and the composite material of the present invention have excellent adhesive property as described above, therefore a good adhesion state is obtained even on the smooth copper foil surface. As a result, an advantage that the transmission characteristic of the high-frequency signal is good may be provided.

In addition, in a case where the porous fluororesin is used as the base material, in addition to a high strength, the resin impregnated material and the composite material which are thinner as compared with a case of using a fibrous woven fabric are obtained, and a product excellent in smoothness without unevenness due to folding of the woven fabric or the like is obtained.

The above composite material of the present invention has repairability which means that the composite material can be simply detached off by heating to, for example, approximately 200° C. or more and by applying a light force after laminating and curing the composite material to the object. Therefore, an advantage that a defective product can be detached off by a simple process, or corrected by manual soldering at the final stage of the manufacture of the printed circuit board may be provided.

Since the above composite material has an extremely low elastic modulus, the copper-clad laminate using the composite material of the present invention or the electronic material laminated with the resin impregnated material is excellent in impact resistance and vibration resistance which is important in vehicle mounting, and the like.

BRIEF DESCRIPTION OF DRAWING

FIG. 1 is a view schematically illustrating a wiring board according to an embodiment to which a curable resin composition of the present invention is applied.

DESCRIPTION OF EMBODIMENTS

Hereinafter, embodiments of the present invention will be described in detail.

In the resin impregnated material of the present invention, a curable resin composition (hereinafter, simply referred to as "resin composition" in some cases) containing a bismaleimide compound (A) represented by General Formula (I) is used as a matrix resin.

[chemical formula 1]

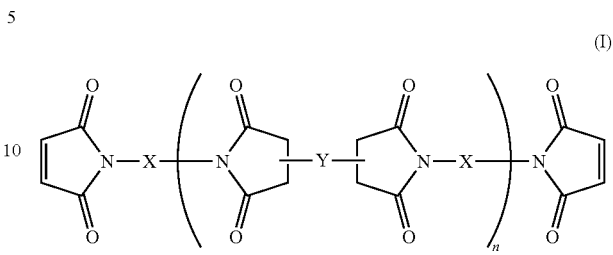

Herein, in Formula (I), X represents an aliphatic, alicyclic, or aromatic hydrocarbon group having 10 to 30 carbon atoms in the main chain, and these groups may have a hetero atom, a substituent, or a siloxane skeleton. X is preferably an aliphatic hydrocarbon group, an alicyclic hydrocarbon group, or an aliphatic hydrocarbon group modified with an alicyclic hydrocarbon group, is more preferably an aliphatic hydrocarbon group having 10 to 55 carbon atoms, and even more preferably 10 to 40 carbon atoms.

Y represents an aliphatic, alicyclic, or aromatic hydrocarbon group, and these groups may have a hetero atom, a substituent, a phenyl ether skeleton, a sulfonyl skeleton, or a siloxane skeleton. Y is preferably an aromatic hydrocarbon group.

n is the number of repeating units and represents a number in the range of 1 to 20. When n is 1 or more, the resin impregnated material and the composite material having excellent dielectric properties can be obtained. In addition, n is preferably 20 or less, and more preferably 10 or less. When n is 20 or less, a resin impregnated material and a composite material having excellent strength can be obtained. One kind of the bismaleimide compound in which n is 1 to 20 may be used alone, or two or more kinds thereof may be used in combination, however, it is more preferable that the bismaleimide compound is a mixture of compounds in which n is 1 to 10.

In addition, the bismaleimide compound used in the present invention may be a mixture of compounds in which n in General Formula (I) is any number in the range of 1 to 20. The proportion of the compound in which n is 0 in the mixture is preferably 5% to 30% by mass. The proportion of the compound in which n is 0 can be measured by gel permeation chromatography (GPC).

More specifically, the proportion of a peak area derived from the bismaleimide compound in which n is 0 in the total peak area derived from the bismaleimide compound in which n is 0 to 20 obtained by measurement using GPC is preferably 5% to 30%, and more preferably 10% to 20%. When the peak area ratio of the bismaleimide compound in which n is 0 is 5% or more, a resin impregnated material and a composite material excellent in strength can be obtained. In addition, when the peak area ratio of the bismaleimide compound in which n is 0 is 30% or less, a resin impregnated material and a composite material having excellent dielectric properties and reflow resistance can be obtained.

Although the method of the above GPC analysis is not particularly limited, it can be obtained in terms of polystyrene using a sample in which a bismaleimide compound is dissolved in tetrahydrofuran (THF).

In addition, in the bismaleimide compound used in the present invention, the proportion of the total amount of the compound in which n is 0 and the compound in which n is 1 in the mixture of the compounds in which n is in the range of 1 to 20 in General Formula (I) is preferably 15% to 30% by mass. More specifically, with respect to the sum of the peak area derived from the bismaleimide compound in which n is 0 to 20, which is obtained by measurement using the GPC, the sum of the peak area ratio in which n is 0 and the peak area ratio in which n is 1 is preferably 15% to 30%, and more preferably 20% to 24%. When the sum of the peak area ratio in which n is 0 and the peak area ratio in which n is 1 is 15% or more, a resin impregnated material and a composite material excellent in strength can be obtained. In addition, when the sum of the peak area ratio in which n is 0 and the peak area ratio in which n is 1 is 30% or less, a resin impregnated material and a composite material excellent in dielectric properties can be obtained.

The method for manufacturing the above bismaleimide compound is not particularly limited, and it can be manufactured, for example, by a known method of subjecting an acid anhydride and a diamine to a condensation reaction, and thereafter dehydrating to effect cyclization (imidization).

Examples of acid anhydrides that can be used for the manufacture include polybutadiene-graft-maleic anhydride; polyethylene-graft-maleic anhydride; polyethylene-maleic anhydride alternating copolymer; poly-maleic anhydride-1-octadecene alternating copolymer; polypropylene-graft-maleic anhydride; poly(styrene-maleic anhydride) copolymer; pyromellitic anhydride; maleic anhydride, succinic anhydride; 1,2,3,4-cyclobutanetetracarboxylic acid dianhydride; 1,4,5,8-naphthalenetetracarboxylic acid dianhydride; 3,4,9,10-perylenetetracarboxylic acid dianhydride; bicyclo(2.2.2) oct-7-ene-2,3,5,6-tetracarboxylic acid dianhydride; diethylenetriamine pentaacetic acid dianhydride; ethylenediamine tetraacetic acid dianhydride; 3,3',4,4'-benzophenonetetracarboxylic acid dianhydride; 3,3',4,4'-biphenyltetracarboxylic acid dianhydride; 4,4'-oxydiphthalic anhydride; 3,3',4,4'-diphenylsulfone tetracarboxylic acid dianhydride; 2,2'-bis(3,4-dicarboxyphenyl)hexafluoropropane dianhydride; 4,4'-bisphenol A diphthalic anhydride; 5-(2,5-dioxytetrahydro)-3-methyl-3-cyclohexene-1,2-dicarboxylic acid anhydride; ethylene glycol bis(trimellitic anhydride); hydroquinone diphthalic anhydride; allyl nadic anhydride; 2-octen-1-yl-succinic anhydride; phthalic anhydride; 1,2,3,6-tetrahydrophthalic anhydride; 3,4,5,6-tetrahydrophthalic anhydride; 1,8-naphthalic anhydride; glutaric anhydride; dodecenylsuccinic anhydride; hexadecenylsuccinic anhydride; hexahydrophthalic anhydride; methylhexahydro phthalic anhydride; tetradecenylsuccinic anhydride, and the like.

In addition, examples of diamines include 1,10-diaminodecane; 1,12-diaminododecane; dimer diamine; 1,2-diamino-2-methylpropane; 1,2-diaminocyclohexane; 1,2-diaminopropane; 1,3-diaminopropane; 1,4-diaminobutane; 1,5-diaminopentane; 1,7-diaminoheptane; 1,8-diaminomentane; 1,8-diaminooctane; 1,9-diaminononane; 3,3'-diamino-N-methyldipropylamine; diaminomaleonitrile; 1,3-diaminopentane; 9,10-diaminophenanthrene; 4,4'-diaminooctafluorobiphenyl; 3,5-diaminobenzoic acid; 3,7-diamino-2-methoxyfluorene; 4,4'-diaminobenzophenone; 3,4-diaminobenzophenone; 3,4-diaminotoluene; 2,6-diaminoanthraquinone; 2,6-diaminotoluene; 2,3-diaminotoluene; 1,8-diaminonaphthalene; 2,4-diaminotoluene; 2,5-diaminotoluene; 1,4-diaminoanthraquinone; 1,5-diaminoanthraquinone; 1,5-diaminonaphthalene; 1,2-diaminoanthraquinone; 2,4-cumene diamine; 1,3-bisaminomethylbenzene; 1,3-bisamino methylcyclohexane; 2-chloro-1,4-diaminobenzene; 1,4-diamino-2,5-dichlorobenzene; 1,4-diamino-2,5-dimethylbenzene; 4,4'-diamino-2,2'-bistrifluoromethylbiphenyl; bis(amino-3-chlorophenyl)ethane; bis(4-amino-3,5-dimethylphenyl)methane; bis(4-amino-3,5-diethylphenyl)methane; bis(4-amino-3-ethyldiaminofluorene; diaminobenzoic acid; 2,3-diaminonaphthalene; 2,3-diaminophenol; -5-methylphenyl)methane; bis(4-amino-3-methylphenyl)methane; bis(4-amino-3-ethylphenyl)methane; 4,4'-diaminophenyl sulfone; 3,3'-diaminophenyl sulfone; 2,2-bis(4,(4aminophenoxy)phenyl)sulfone; 2,2-bis(4-(3-aminophenoxy)phenyl)sulfone; 4,4'-oxydianiline; 4,4'-diaminodiphenyl sulfide; 3,4'-oxydianiline; 2,2-bis(4-(4-aminophenoxy)phenyl)propane; 1,3-bis(4-aminophenoxy)benzene; 4,4'-bis(4-aminophenoxy)biphenyl; 4,4'-diamino-3,3'-dihydroxybiphenyl; 4,4'-diamino-3,3'-dimethylbiphenyl; 4,4'-diamino-3,3'-dimethoxybiphenyl; Bisaniline M; Bisaniline P; 9,9-bis(4-aminophenyl)fluorene; o-tolidine sulfone; methylene bis (anthranilic acid); 1,3-bis(4-aminophenoxy)-2,2-dimethylpropane; 1,3-bis(4-aminophenoxy)propane; 1,4-bis (4-aminophenoxy)butane; 1,5-bis(4-aminophenoxy)butane; 2,3,5,6-tetramethyl-1,4-phenylenediamine; 3,3',5,5'-tetramethylbenzidine; 4,4'-diaminobenzanilide; 2,2-bis(4-aminophenyl)hexafluoropropane; polyoxyalkylene diamines (for example, Huntsman's Jeffamine D-230, D400, D-2000, and D-4000); 1,3-cyclohexane bis(methylamine); m-xylylene diamine; p-xylylene diamine; bis(4-amino-3-methylcyclohexyl)methane; 1,2-bis(2-aminoethoxy)ethane; 3(4),8(9)-bis(aminomethyl)tricyclo(5.2.1.0$^{2,6}$)decane, 1,2-bis(aminooctyl)-3-octyl-4-hexyl-cyclohexane, and the like. Among these, from the viewpoint of obtaining a resin impregnated material and a cured product exhibiting excellent dielectric properties and strength, it is preferable to be a diamine having 10 to 30 carbon atoms in the main chain of the alkyl chain.

As the above bismaleimide compound, a commercially available compound can be used, and as a preferred example thereof, BMI-3000 (synthesized from dimer diamine, pyromellitic dianhydride, and maleic anhydride), BMI-1500, BMI-2550, BMI-1400, BMI-2310, BMI-3005 manufactured by DESIGNER MOLECURES Inc., or the like may be suitably used.

Among these, BMI-3000 manufactured by DESIGNER MOLECURES Inc., which is a bismaleimide compound particularly suitably used in the present invention is represented by following structural formula. In Formula, n is a number in the range of 1 to 20.

[chemical formula 2]

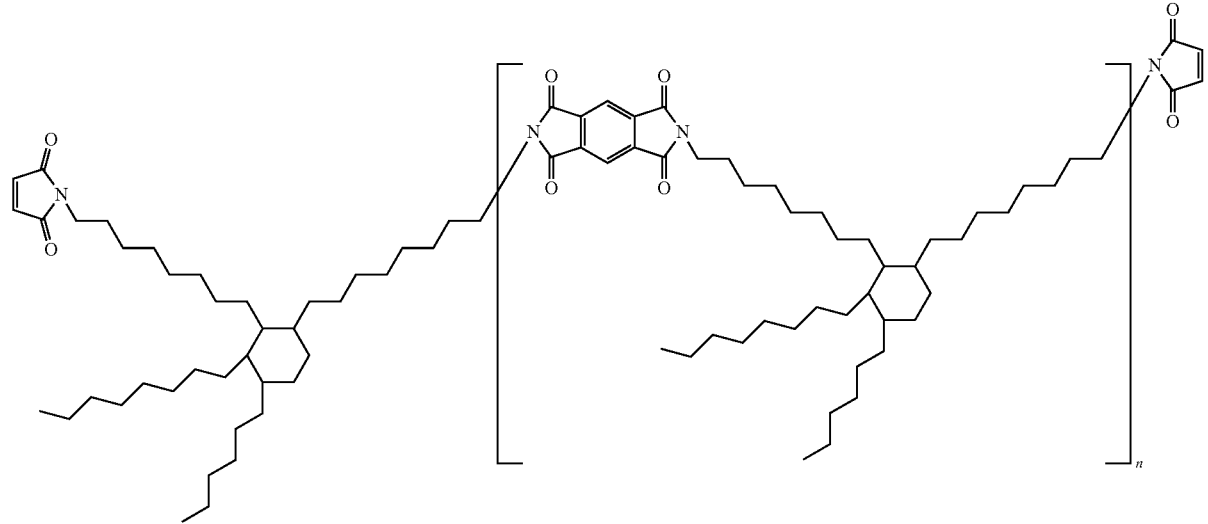

Next, as a radical polymerization initiator (B) used in the present invention, either one or both of a thermal polymerization initiator that initiates radical polymerization by heating, and an energy ray polymerization initiator that initiates radical polymerization by irradiation with energy rays can be used.

The radical polymerization initiator is not particularly limited, and an organic peroxide-based or an azo-based compound used in the related art can be appropriately used.

Examples of the organic peroxide-based initiator include methyl ethyl ketone peroxide, cyclohexanone peroxide, methylcyclohexanone peroxide, methyl acetoacetate peroxide, acetyl acetate peroxide, 1,1-bis(t-hexylperoxy)-3,3,5-trimethylcyclohexane, 1,1-bis(t-hexylperoxy)-cyclohexane, 1,1-bis(t-butylperoxy)-3,3,5-trimethylcyclohexane, 1,1-bis(t-butylperoxy)-2-methylcyclohexane, 1,1-bis(t-butylperoxy)-cyclohexane, 1,1-bis(t-butylperoxy)cyclododecane, 1,1-bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropylbenzene, dicumyl peroxide, 2,5-dimethyl-2,5-bis(t-butylperoxy)hexane, t-butylcumyl peroxide, di-t-butyl peroxide, 2,5-dimethyl-2,5-bis(t-butylperoxy)hexyne-3, isobutyrylperoxide, 3,5,5-trimethylhexanoyl peroxide, octanoyl peroxide, lauroyl peroxide, stearoyl paroxide, succinic acid peroxide, m-toluoylbenzoyl peroxide, benzoyl peroxide, di-n-propyl peroxydicarbonate, diisopropyl peroxydicarbonate, bis(4-t-butylcyclohexyl)peroxydicarbonate, di-2-ethoxyethyl peroxydicarbonate, di-2-ethoxy hexyl peroxydicarbonate, di-3-methoxybutyl peroxydicarbonate, di-s-butyl peroxydicarbonate, di(3-methyl-3-methoxybutyl) peroxydicarbonate, α,α'-bis(neodecanoyl peroxy)diisopropylbenzene, cumyl peroxyneodecanoate, 1,1,3,3-tetramethylbutyl peroxyneodecanoate, 1-cyclohexyl-1-methylethylperoxy neodecanoate, t-hexyl peroxyneodecanoate, t-butyl peroxyneodecanoate, t-hexyl peroxypivalate, t-butyl peroxypivalate, 1,1,3,3-tetramethylbutylperoxy-2-ethylhexanoate, 2,5-dimethyl-2,5-bis(2-ethylhexanoylperoxy)hexanoate, 1-cyclohexyl-1-methylethylperoxy-2-ethylhexanoate, t-hexylperoxy-2-ethylhexanoate, t-butylperoxy-2-ethylhexanoate, t-hexylperoxyisopropyl monocarbonate, t-butyl peroxyisobutyrate, t-butyl peroxymaleate, t-butyl peroxy-3,5,5-trimethylhexanoate, t-butyl peroxylaurate, t-butyl peroxy isopropyl monocarbonate, t-butyl peroxy-2-ethylhexyl monocarbonate, t-butyl peroxyacetate, t-butyl peroxy-m-toluyl benzoate, t-butyl peroxybenzoate, bis(t-butylperoxy)isophthalate, 2,5-dimethyl-2,5-bis(m-toluylperoxy)hexane, t-hexylperoxybenzoate, 2,5-dimethyl-2,5-bis(benzoylperoxy)hexane, t-butylperoxyallyl monocarbonate, t-butyl trimethylsilyl peroxide, 3,3',4,4'-tetra(t-butylperoxycarbonyl)benzophenone, 2,3-dimethyl-2,3-diphenylbutane, and the like.

In addition, examples of the azo-based initiator include 2-phenylazo-4-methoxy-2,4-dimethylvaleronitrile, 1-[(1-cyano-1-methylethyl)azo]formamide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(2-methylpropionamidine)dihydrochloride, 2,2'-azobis(2-methyl-N-phenylpropionamidine)dihydrochloride, 2,2'-azobis[N-(4-chlorophenyl)-2-methylpropionamidine]dihydridochloride, 2,2'-azobis[N-(4-hydrophenyl)-2-methylpropionamidine]dihydrochloride, 2,2'-azobis[2-methyl-N-(phenylmethyl)propionamidine]dihydrochloride, 2,2'-azobis[2-methyl-N-(2-propenyl)propionamidine]dihydrochloride, 2,2'-azobis[N-(2-hydroxyethyl)-2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis[2-[1-(2-hydroxyethyl)-2-imidazolin-2-yl]propane]dihydrochloride, 2,2'-azobis[2-(2-imidazolin-2-yl)propane], 2,2'-azobis[2-methyl-N-[1,1-bis(hydroxymethyl)-2-hydroxyethyl]propionamide], 2,2'-azobis[2-methyl-N-[1,1-bis(hydroxymethyl) ethyl]propionamide], 2,2'-azobis[2-methyl-N-(2-hydroxyethyl)propionamide], 2,2'-azobis(2-methylpropionamide), 2,2'-azobis(2,4,4-trimethylpentane), 2,2'-azobis(2-methylpropane), dimethyl-2,2-azobis(2- methyl propionate), 4,4'-azobis(4-cyanopentanoic acid), 2,2'-azobis[2-(hydroxymethyl)propionitrile], and the like.

One type of the above thermal polymerization initiator may be used alone, or two or more types thereof may be used in combination.

In addition, the energy ray polymerization initiator is not particularly limited, and those used in the related art such as alkylphenone type, acylphosphine type, oxime ester type, thioxanthone type, and the like can be appropriately used. Specific examples include the energy ray polymerization initiators such as acetophenone, 2,2-dimethoxyacetophenone, p-dimethylaminoacetophenone, Michler's ketone, benzyl, benzoin, benzoin methyl ether, benzoin ethyl ether, benzoin isopropyl ether, benzoin n-propyl ether, benzoin isopropyl ether, benzoin n-butyl ether, benzyl dimethyl ketal, thioxanthone, 2-chlorothioxanthone, 2-methylthioxanthone, 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2hydroxyethoxy)-phenyl]-2-hydroxy-2-methyl-1-propan-1-one, 2-hydroxy-1-{4-[4-(2-hydroxy-2-methyl-propionyl)benzyl]phenyl}-2-methyl-propan-1-one, 2-methyl-1-(4-methylthiophenyl)-2-morpholinopropane-1-one, 2-benzyl-2-dimethylamino-1-(4-morpholinophenyl)-1-butanone, 2,4,6-trimethylbenzoyl-diphenyl-phosphine oxide, bis(2,4,6-trimethylbenzoyl)-phenylphosphine oxide, 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), 2,4-dimethylthioxanthone, 2-isopropyl thioxanthone, and the like. As such an energy ray polymerization initiator, one type may be used alone, or two or more types may be used in combination.

Among these, from the viewpoint that it is possible to form a fine pattern by using a reduction projection aligner (stepper; light source wavelength: 365 nm and 436 nm) which is standardly used in the process of manufacturing a semiconductor protective film, or the like, it is preferable to use those which efficiently generate radicals at an exposure wavelength of 310 to 436 nm (more preferably 365 nm). In addition, it is difficult to generally perform homopolymerization by radicals in maleimide groups, and the dimerization reaction of the bismaleimide compound progresses mainly by reaction with radicals generated from the energy ray polymerization initiator, so that it is considered that the bismaleimide compound is poor in apparent reactivity as compared with an acrylic compound or the like generally used as the energy ray polymerizable compound. Accordingly, from the viewpoint that radicals can be generated more efficiently, and reactivity at an exposure wavelength of 310 to 436 nm (more preferably 365 nm) may be improved, it is more preferable that the compound has at least one structure selected from an oxime structure and a thioxanthone structure.

Examples of such an energy ray polymerization initiator include 1,2-octanedione, 1-[4-(phenylthio)-, 2-(O-benzoyloxime)] ("IRGACURE OXE-01" manufactured by BASF Japan Ltd.), and ethanone, 1-[9-ethyl-6-(2-methylbenzoyl)-9H-carbazol-3-yl]-, 1-(O-acetyloxime) ("IRGACURE OXE-02" manufactured by BASF Japan Ltd.) which have an oxime structure, and 2,4-dimethylthioxanthone having a thioxanthone structure ("DETX-S" manufactured by Nippon Kayaku Co., Ltd.)

In the curable resin composition used in the present invention, although the content of the above radical polymerization initiator may be any amount as long as the content is stoichiometrically necessary amount with respect to the amount of the bismaleimide compound, and varies depending on the type thereof, in the case of a thermal polymerization initiator, as a guide, the content is preferably 0.1 to 20 parts by mass, and more preferably 1 to 10 parts by mass, based on 100 parts by mass of the bismaleimide compound. In addition, in the case of the energy ray polymerization initiator, it is preferably 0.05 to 10 parts by mass, and more preferably 0.1 to 5 parts by mass. In a case where the content of the radical polymerization initiator is within this range, curing of the resin impregnated material is sufficient. In addition, by selecting the type and amount of the radical polymerization initiator, the resin impregnated material of the present invention can be used according to the purpose such as reduction of curing time and long-term storage stability at room temperature.

The curable resin composition may further contain a coupling agent in order to further improve the adhesive property to various materials.

Examples of such a coupling agent include a silane coupling agent such as 2-(3,4-epoxycyclohexyl)ethyltrimethoxysilane, 3-glycidoxypropylmethyldimethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 3-ureidopropyltriethoxysilane, 3-isocyanate propyl triethoxysilane, and the like; a coupling agent such as an alkoxy oligomer having both an organic group such as an epoxy group and an alkoxysilyl group, and the like. One type of these may be used alone, or two or more types thereof may be used in combination.

In a case where the coupling agent is contained in the curable resin composition used in the present invention, the content thereof is preferably 0.1 to 10% by mass in the entire resin composition. In a case where the content of the coupling agent is within this range, significantly improved effect of adhesive property due to addition can be obtained and generation of aggregates of the coupling agent can be prevented.

An organic solvent can be appropriately contained in the curable resin composition containing the above bismaleimide compound and the radical polymerization initiator. The organic solvent usable in the present invention is not particularly limited, and examples thereof include benzene, toluene, xylene, tetralin, mesitylene, and the like. One type of these may be used alone, or two or more types thereof may be used in combination.

The curable resin composition used in the present invention may further contain filler, if necessary. By including the filler, a viscosity of the curable resin composition can be adjusted to improve handling properties. The type of the filler is not particularly limited, may be appropriately selected depending on the application, and examples thereof include aluminum hydroxide, aluminum oxide (alumina), silicon dioxide (silica), hollow fillers such as hollow silica and hollow glass particles, silicon nitride, fluororesin particles, chopped strands of fluororesin, and the like. Although the content of the filler is selected according to the purpose of use, and is not particularly limited, as a guide, it is preferably 0.01 to 400 parts by mass, and more preferably 0.1 to 100 parts by mass, based on 100 parts by mass of the bismaleimide compound.

Next, a base material of the resin impregnated material according to the present invention will be described. The base material used in the present invention is preferably a porous fluororesin having a porosity of 50% to 97%. The type of the porous fluororesin is not limited, and tetrafluoroethylene/perfluoroalkyl vinyl ether copolymer (PFA), tetrafluoroethylene/hexafluoropropylene copolymer (FEP), polytetrafluoroethylene (PTFE), tetrafluoroethylene/ethylene copolymer (ETFE), polyvinylidene fluoride (PVDF), polychlorotrifluoroethylene (PCTFE), chlorotrifluoroethylene/ethylene copolymer (ECTFE) or the like, can be used. Among these, PTFE is preferable in terms of heat resistance and electrical properties. The form may be any of fiber bundles, woven fabrics, nonwoven fabrics, porous sheets, and the like as long as the porosity is within the above range. In order to increase the content ratio of the curable resin composition, the porosity is preferably 60% or more, and more preferably 70% or more. In addition, in order to maintain the strength of the resin impregnated material and the composite, the porosity is preferably 95% or less, and more preferably 90% or less. The porosity of the base material can be calculated from the following equation using the apparent density p.

$$\text{Porosity}(\%)=[(2.2-p/2.2]\times 100$$

Herein, in the formula, "2.2" is the true density (g/cm$^3$) of the base material.

In addition, the pore has an average pore diameter of preferably 0.01 µm to 100 µm, and more preferably 0.1 µm to 1.0 µm. When the average pore diameter is 0.01 µm or more, the adhesion between the bismaleimide compound and the fluororesin becomes good, and when the average pore diameter is 100 µm or less, the strength of the curable resin composition becomes good. The size of the pore can be measured by, for example, a mean flow point method using a porometer.

The content ratio of the porous fluororesin in the composite material of the present invention is preferably 20% to 90% by mass, and more preferably 30% to 80% by mass. When the content ratio is 20% by mass or more, the dielectric properties become good. When the content is 90% by mass or less, the strength of the composite material becomes high.

In a case where the base material is sheet-form, although the thickness is not particularly limited and can be selected according to the purpose, for the purpose of obtaining a copper-clad laminate, the thickness is preferably 10 to 1,000 µm, and more preferably 20 to 500 µm. In this specification, a sheet and a film are not particularly distinguished, and a "sheet" is used as a word including a film.

The base material can be subjected to a surface treatment for improving the adhesive property. Examples of the surface treatment include a plasma treatment, a corona discharge treatment, an ultraviolet irradiation treatment, a radiation exposure treatment, a chemical etching treatment, an excimer laser treatment, and the like. In addition, the base material may be a single layer or an integrated laminate of a plurality of layers.

An expanded porous PTFE (ePTFE) sheet is particularly suitably used as a base material satisfying the above requirements. As the expanded porous PTFE sheet, a product sold under the trade name of Gore-Tex by W. L. GORE, USA can be suitably used. The product is a high-strength porous material having a large number of uniform submicron pores (pore portions) formed by stretching, and the same type of products that other companies supply to the market can be used. The expanded porous PTFE sheet can be obtained by stretching the paste molded body formed by mixing a fine powder of polytetrafluoroethylene with a forming aid after removing the forming aid, or by stretching without removing the forming aid and firing if necessary. In a case of uniaxial stretching, a fine filamentous structure (hereinafter referred to as fibril) oriented in the stretching direction has a ladder-like fiber structure having a lot of pores defined by a region (hereinafter, node) in which PTFE fine particles exist at high density between fibrils. In addition, in the case of biaxial stretching, the fibrils spread radially, resulting in a spider web-like fiber structure in which multiple pores defined by nodes and fibrils.

The expanded porous PTFE sheet has higher strength than the unexpanded PTFE sheet because the molecules of polytetrafluoroethylene are oriented in the stretching direction. The expanded PTFE and unexpanded PTFE can be distinguished by the peak of a differential thermal analysis curve of a differential scanning calorimetry (DSC). That is, the differential thermal analysis curve peak of the burned substance of unexpanded PTFE lies between 325° C. and 340° C., whereas the same peak of expanded PTFE is between 325° C. and 340° C. Besides, the expanded PTFE also has a peak between 360° C. and 380° C.

The resin impregnated material of the present invention can be obtained by impregnating the above curable resin composition into the base material such as the above porous fluororesin sheet. Compositions in which the solvent partially or completely evaporates from the curable resin composition, or compositions in which polymerization is progressed by further heating and/or energy ray irradiation are included in the resin impregnated material in the present invention. When evaporating the solvent, the compositions can be heated at approximately 100° C. or less if necessary.

The obtained resin impregnated material can be cured by heating and/or energy ray irradiation to obtain a composite material. Generally, several sheets are overlapped in order to adjust the resin impregnated material to a desired thickness. If necessary, the several sheets are overlapped with copper foil, or the like, and heated while applying pressure. Although the heating conditions are selected depending on the composition of the curable resin composition, the type and amount of a curing catalyst, the thickness of the composite material, and the like, and are not limited, it is approximately 0.5 to 4 hours at 150° C. to 200° C. as a guide. The energy ray is not limited as long as the ray can generate radicals by irradiation, and although examples thereof include heat rays such as far infrared rays and infrared rays, ultraviolet rays, X rays, electron beams, and the like, the ultraviolet rays can be suitably used from the point that no extensive equipment is required.

When pressurizing the sheets overlapped with the copper foil or the like, by appropriately setting the pressure condition, the curable resin composition can be squeezed out from the pores of the base material such as the porous fluororesin sheet and the proportion occupied by the base material such as the porous fluororesin sheet can be increased. When a material having a low dielectric constant is used as the base material, the dielectric constant of the resin impregnated material at 10 GHz can be set to 2.1 to 2.5, and the dielectric loss tangent can be set within the range of 0.0003 to 0.0028.

In addition, to the curable resin composition of the present invention, a resin such as polyester resin, imide resin, amide resin, acrylic resin, epoxy resin, and the like, or known additives such as coloring agent, flame retardant, filler, and the like can be added as long as the effect of the invention is not impaired.

Next, an example of the copper-clad laminate of the present invention and a manufacturing method thereof will be described.

In the copper-clad laminate of the present invention, one or more resin impregnated materials and one or more copper foils are adhered and integrated. The thickness of each layer and the order of lamination are appropriately determined depending on the purpose of the laminate.

The method for manufacturing the copper-clad laminate using the resin impregnated material of the present invention is not particularly limited, and a dry lamination method or a wet lamination method can be used. As the wet lamination method, a known method such as a contact lamination method, a vacuum lamination method, a high pressure lamination method, a centrifugal lamination method, or the like can be adopted. An example of a method for obtaining a copper-clad laminate by the dry lamination method will be described below. First, a radical polymerization initiator (solvent and other additives if necessary) is added to a bismaleimide compound to manufacture a curable resin composition. Subsequently, the curable resin composition is impregnated into the porous fluororesin, then heated and dried, and the curable resin composition may be semi-cured if necessary to obtain the resin impregnated material of the present invention. The resin impregnated material may be laminated alone or a plurality of the resin impregnated materials may be laminated in accordance with a desired thickness, and the copper foils are further overlapped thereon, heated and pressed for a certain period of time to obtain a copper-clad laminate.

In the copper-clad laminate obtained in this manner, a printed wiring board can be formed by etching a pattern on the copper foil to form a circuit, or a plurality of copper-clad laminates can be laminated to form a multilayer CCL.

Since the resin impregnated material and the composite according to the present invention are excellent in adhesion between the bismaleimide compound and the fluororesin base material by combining the curable resin composition containing the bismaleimide compound having the above specific structure with a fluororesin base material having a predetermined porosity, the resin impregnated material and the composite have all of excellent dielectric properties, high insulation property, high heat resistance, low-stress property, water resistance, moisture resistance, repairability of the composite, impact resistance, high reliability, and the like. Therefore, the composite can be suitably used for bonding circuit boards, and the like, and the copper-clad laminate thereof may be suitably used particularly for an electronic circuit board which is required to have high-frequency characteristics.

More specifically, since the resin impregnated material and the composite of the present invention are flexible and excellent in fitting properties, the resin impregnated material and the composite can be suitably used for laminating regardless of the shape such as slight unevenness or warping on the surface of the object. Therefore, in a case of being semi-cured up to B stage and laminated with copper foil, a laminate having extremely excellent dielectric properties and adhesive property and high bonding reliability can be obtained. In addition, since the maleimide compound used in the present invention has a hydrophobic structure, the composite material is excellent in water resistance and moisture resistance, and the change in dielectric properties due to moisture absorption can be extremely reduced.

In addition, in a case where the porous fluororesin sheet is used as the fluororesin, due to the combination effect of the specific bismaleimide compound and the porous fluororesin sheet used in the present invention, a cured product having high strength can be obtained as compared with the case that only resin is used. In addition, it is possible to obtain an extremely thin resin impregnated material as compared with a case of using a fibrous woven fabric, and there is no unevenness due to overlapping of warp and weft inevitable in the woven fabric, so that a product with high smoothness can be obtained.

Furthermore, since the resin impregnated material of the present invention can be fed in a roll form, it is possible to continuously manufacture and supply the copper-clad laminate. Therefore, the resin impregnated material can be subjected to a continuous process, which can contribute to an improvement in productivity.

Unlike the prepreg cured product, and the like in the related art, the above composite material of the present invention has all of extremely excellent flexibility, heat resistance, and dielectric properties, and is further excellent in high insulating properties and water resistance.

The composite material according to the present invention exhibits extremely excellent adhesive property at room temperature. However, the adhesive force is extremely reduced at high temperatures of approximately 200° C., and the composite material can be easily detached off from the substrate or the like by applying a light force. This property is referred to as "repairability" in this specification. This is because the bismaleimide compound used in the present invention has a specific maleimide structure. Especially, the reason why this "repairability" may be achieved is because of not only the flexibility imparted to the composite due to the low content ratio of crosslinking point, but a certain degree of thermoplastic property. On the other hand, since the composite has a thermosetting property, that is, a three-dimensional crosslinked structure, there is no possibility of flowing out due to its own weight, and the elastic modulus is greatly reduced as compared with the epoxy resin used for the electronic circuit board. Therefore, since the composite material according to the present invention may absorb stress due to a difference in expansion rate from the laminated material (for example, PTFE/maleimide compound/copper foil in a case of copper-clad laminate) and can prevent occurrence of detachment, and the like, reliability can be maintained even in a case of exposure to an environment where the temperature rapidly changes or a mechanical impact is received.

The occurrence of defective products at the final stage of the manufacture of the printed circuit board normally causes tremendous damage. However, in a case where the resin impregnated material and the composite of the present invention are used, it is possible to repair the defective portion by detaching the defective portion in a simple process. In addition, since the bismaleimide compound used in the present invention is the thermosetting resin having high heat resistance, the compound does not flow out even if the compound is partially heated to near 400° C. by manual soldering or the like, and there is no possibility of deterioration in physical properties due to thermal degradation as long as it is a short time such as ordinary manual soldering process. In addition, since the elastic modulus is extremely low, a detachment of the conductive layer is suppressed even if softened, and even if the thickness changes due to the thermal expansion of an insulating layer, if the temperature decreases, the compound has the property of returning to the original thickness. In the liquid crystal polymer substrate, since the resin is completely thermoplastic (non-crosslinked structure), when stress is sectionlly applied in a state where a temperature exceeds 300° C. which is the processing temperature of the liquid crystal polymer, a thickness change occurs due to plastic deformation of the insulating layer, which causes problems in securing reliability. Therefore, repair with manual soldering is practically impossible. According to the composite material of the present invention, it can be said that the point that it is possible to repair a slight defect of the printed circuit board with manual soldering is a great merit as compared with the case of using the liquid crystal polymer.

The copper-clad laminate of the present invention is a product obtained by laminating and curing the resin impregnated material and the copper foil, and is excellent in impact resistance and vibration resistance which is important in vehicle mounting, and the like. In addition, since the elastic modulus is low, it is possible to absorb stress due to a difference in linear expansion between materials when formed into the copper-clad laminate. Therefore, the delamination can be prevented.

According to the related art, there is a problem that other properties are sacrificed and deteriorated by having one of the above properties, whereas according to the present invention, remarkable effects may be achieved because a product having all the above properties can be obtained in a well-balanced manner.

As described above, since the resin impregnated material of the present invention is superior to the LCP in dielectric properties, heat resistance, mechanical properties, and the like, the resin impregnated material can be suitably used as printed wiring boards such as a flexible printed wiring board, a rigid printed wiring board of various thicknesses and materials, and a material for protecting a radar.

In a case of being used for the printed wiring board, a printed wiring board can be prepared by forming a circuit pattern made of copper foil on one side or both sides of the resin impregnated material by a known method.

Since the circuit board using the LCP has poor adhesion to the copper foil, unless a deep uneven shape is formed on the surface of the copper foil and the anchor effect due to the unevenness is used, a printed wiring board that can be practical use could not be obtained. However, copper foil having the deep uneven shape on the surface has a problem of tremendous transmission loss in a case of being used as a high-frequency signal circuit. On the other hand, since the resin impregnated product of the present invention is excellent in adhesion to copper foil, it is possible to reduce the degree of unevenness as compared with a case of using the LCP, and the transmission loss in the high-frequency signal circuit can be minimized.

In addition, the printed wiring board using the resin impregnated material of the present invention can be used in a known structure such as a single-sided printed wiring board, a double-sided printed wiring board, a multilayer printed wiring board, a built-up multilayer printed wiring board, or the like. In addition, an electromagnetic wave shielding film can be attached to these known structures to form a shielded printed wiring board.

When the resin impregnated material of the present invention is used for the flexible printed wiring board, for example, as illustrated in FIG. 1, the electromagnetic wave shielding film is attached to one surface of the double-sided flexible printed wiring board, so that the shielded flexible printed wiring board having a stripline structure can be obtained. By adopting such a structure, it is possible to easily manufacture the flexible printed wiring board excellent both in transmission characteristics of high-frequency signals and in shielding characteristics.

In addition, in multilayer printed wiring boards and build-up multilayer printed wiring boards, as the interlayer connecting material, a conductive composition containing high melting point metal particles, low melting point metal particles, and a resin composition, and forming an intermetallic compound with the high melting point metal when the low melting point metal is melted may be used. By using such a conductive composition, the metal particles and the copper foil firmly adhere to each other and the intermetallic compound has a high melting point, so that the connection reliability can be ensured even when exposed to high temperature.

As the low melting point metal particles and the high melting point metal particles, particles containing an alloy of two or more metals can be used in addition to particles made of a single metal. Preferred examples of the metal forming the low melting point metal particles include indium (melting point: 156° C.) alone, or an alloy with a melting point of 180° C. or lower containing two or more metals selected from tin (melting point: 231° C.), lead (melting point: 327° C.), bismuth (melting point: 271° C.), and indium. In addition, preferred examples of the metal forming the high melting point metal particles include one metal or an alloy of two or more metals selected from gold (melting point: 1,064° C.), silver (melting point: 961° C.), copper (melting point: 1,083° C.), and nickel (melting point: 1,455° C.).

In addition, additives added to the interlayer connecting material in the related art may be added within a range not deviating from the object of the present invention. Examples thereof include a defoaming agent, a thickening agent, an adhesive, and the like.

The C stage, that is, the cured product sheet with the resin impregnated material of the expanded porous PTFE-bismaleimide compound, which is one embodiment of the composite of the present invention, is flexible like a cloth, can be folded, and has extremely excellent dielectric properties. Furthermore, it has been confirmed that it also has excellent physical properties and heat resistance which can be used as an electronic circuit board. In addition, since the cured product sheet serving as the above composite is a fiber reinforced plastic (FRP) having a structure filled with the bismaleimide compound between dense fibers of the expanded porous PTFE, the cured product sheet is flexible and has high tension.

The cured product sheet serving as one embodiment of the composite material of the present invention can be used for forming the outer shape of the radome as a material for protecting the radar. As a use method thereof, it is not limited to use with the cured product sheet according to the present invention alone, and, for example, it may adopt a structure of a combination such that hard PTFE is used as a structural skeleton and the cured product sheet according to the present invention is laid therebetween. In this case, it is possible to form a balloon-shaped structure in which the interior is made positive pressure in principle, which makes it possible to increase the strength of the outermost layer of the radome. For such applications, it is possible to use only the expanded porous PTFE in the related art, but since the expanded porous PTFE has fine pores, in order to maintain positive pressure and strength, it is necessary to keep sending large amounts of gas. Therefore, in this application, the cured product sheet made of the expanded porous PTFE and the bismaleimide compound serving as the composite according to the present invention is overwhelmingly advantageous.

The composite material of the present invention can be applied not only as a radome but also as a structural material in the field using high-frequency and ultra-high-frequency, for example, ETC equipment for expressway, auto stop device for a car, furthermore, and for ultra-high-frequency fields where the demand is further expanding in the future.

EXAMPLES

Examples of the present invention are described below, but the present invention is not limited by the following examples. In the following, the mixing proportion, and the like are based on mass unless otherwise specified.

Synthesis of Bismaleimide Compound

Synthesis Example 1 (Synthesis of Bismaleimide Compound 4)

250 mL of toluene was charged to a 1,000 mL flask equipped with a stirrer. 35 g (0.35 mol) of triethylamine was added to the flask, and subsequently 35 g (0.36 mol) of methanesulfonic anhydride was slowly added to form a salt.

The mixture was stirred for approximately 10 minutes and subsequently, 50 g (0.11 mol) of a diamine (n is 6, q is 6, m is 5, and p is 5) represented by General Formula (II) was added. Pyromellitic anhydride (10.9 g, 0.05 mol) was added dropwise to the stirred mixture and dissolved therein, and thereafter caused to be refluxed for 2 hours to obtain a reaction mixture having an amine terminated diimide.

[chemical formula 3]

$$CH_3(CH_2)_mCH_2CH_2CH(CH_2)_nCH_2NH_2 \\ | \\ CH_3(CH_2)_pCH(CH_2)_qCH_2NH_2 \quad (II)$$

Subsequently, the obtained reaction mixture was cooled to room temperature or lower, 12.8 g of maleic anhydride and then 5 g of methanesulfonic anhydride were introduced into the flask and refluxed.

After cooling to room temperature, 100 mL of toluene was added to the flask to obtain a precipitate. The liquid phase in the flask was removed, the precipitate was washed with toluene, thereafter left overnight, and filtered by a glass frit funnel filled with silica gel. Subsequently, the residue of filtration was allowed to stand in a vacuum environment to remove the solvent, so that a bismaleimide compound 4 was obtained.

Synthesis Example 2 (Synthesis of Bismaleimide Compound 5)

A bismaleimide compound 5 was obtained in the same manner as in Synthesis Example 1, except that 50 g (0.11 mol) of the diamine (n is 6, q is 6, m is 5, and p is 5) represented by General Formula (II) was used as a diamine.

Synthesis Example 3 (Synthesis of Bismaleimide Compound 6)

A bismaleimide compound 6 was obtained in the same manner as in Synthesis Example 1, except that 42 g (0.11 mol) of the diamine (n is 4, q is 3, m is 5, and p is 5) represented by General Formula (II) was used as a diamine.

Synthesis Example 4 (Synthesis of Bismaleimide Compound 7)

A bismaleimide compound 7 was obtained in the same manner as in Synthesis Example 1, except that 71 g (0.11 mol) of the diamine (n is 13, q is 13, m is 5, and p is 5) represented by General Formula (II) was used as a diamine.

Comparative Synthesis Example 1 (Synthesis of Bismaleimide Compound 8)

A bismaleimide compound 8 was obtained in the same manner as in Synthesis Example 1, except that 37 g (0.11 mol) of the diamine (n is 2, q is 2, m is 5, and p is 5) represented by General Formula (II) was used as a diamine.

Comparative Synthesis Example 2 (Synthesis of Bismaleimide Compound 9)

A bismaleimide compound 9 was obtained in the same manner as in Synthesis Example 1, except that 79 g (0.11 mol) of the diamine (n is 15, q is 16, m is 5, and p is 5) represented by General Formula (II) was used as a diamine.

Preparation of Curable Resin Composition

Example 1

100 parts by mass of bismaleimide compound 1 (BMI-3000CG manufactured by DESIGNER MOLECULES Inc., the number of carbon atoms of the main chain of a hydrocarbon group X in Formula (I) is 18 and the content proportion of a bismaleimide compound in which n is 0 is 14%) as a bismaleimide compound and 2 parts by mass of dicumyl peroxide as a radical polymerization initiator were added to 120 parts by mass of toluene and stirred at room temperature to obtain a curable resin composition.

As the content proportion of the bismaleimide compound in which n is 0, the proportion of the area of the peak by the bismaleimide compound in which n is 0 in the total area of the peaks of the bismaleimide compounds was used to represent. The analysis method for bismaleimide was GPC. The same applies to the following Examples and Comparative Examples. The same applies to the following Examples and Comparative Examples.

Example 2

A curable resin composition was obtained in the same manner as in Example 1, except that compound 2 (BMI-3000GEL manufactured by DESIGNER MOLECURES Inc., the number of carbon atoms of the main chain of a hydrocarbon group X in Formula (I) is 18 and the content proportion of a bismaleimide compound in which n is 0 is 24%) was used as a bismaleimide compound.

Example 3

A curable resin composition was obtained in the same manner as in Example 1, except that compound 3 (BMI-3000J manufactured by DESIGNER MOLECURES Inc., the number of carbon atoms of the main chain of a hydrocarbon group X in Formula (I) is 18 and the content proportion of a bismaleimide compound in which n is 0 is 9%) was used as a bismaleimide compound.

Example 4

A curable resin composition was obtained in the same manner as in Example 1, except that compound 4 obtained in Synthesis Example 1 (number of carbon atoms of the main chain of a hydrocarbon group X in Formula (I) is 16 and the content proportion of a bismaleimide compound in which n is 0 is 6%) was used as a bismaleimide compound.

Example 5

A curable resin composition was obtained in the same manner as in Example 1, except that compound 5 obtained in Synthesis Example 2 (number of carbon atoms of the main chain of a hydrocarbon group X in Formula (I) is 16 and the content proportion of a bismaleimide compound in which n is 0 is 29%) was used as a bismaleimide compound.

Example 6

A curable resin composition was obtained in the same manner as in Example 1, except that compound 6 obtained in Synthesis Example 3 (number of carbon atoms of the main chain of a hydrocarbon group X in Formula (I) is 11 and the content proportion of a bismaleimide compound in which n is 0 is 14%) was used as a bismaleimide compound.

Example 7

A curable resin composition was obtained in the same manner as in Example 1, except that compound 7 obtained in Synthesis Example 4 (number of carbon atoms of the main chain of a hydrocarbon group X in Formula (I) is 30 and the content proportion of a bismaleimide compound in which n is 0 is 14%) was used as a bismaleimide compound.

Comparative Example 1

A curable resin composition was obtained in the same manner as in Example 1, except that compound 8 obtained in Comparative Synthesis Example 1 (number of carbon atoms of the main chain of a hydrocarbon group X in Formula (I) is 8 and the content proportion of a bismaleimide compound in which n is 0 is 14%) was used as a bismaleimide compound.

Comparative Example 2

A curable resin composition was obtained in the same manner as in Example 1, except that compound 9 obtained in Comparative Synthesis Example 2 (number of carbon atoms of the main chain of a hydrocarbon group X in Formula (I) is 35 and the content proportion of a bismaleimide compound in which n is 0 is 14%) was used as a bismaleimide compound.

The PET film whose surface was subjected to releasing treatment was coated with the curable resin composition obtained above to a thickness of 25 μm, heated at 80° C. for 5 minutes for drying, and thereafter the PET film was detached off to obtain a curable resin film.

Subsequently, the upside and downside of a porous fluorine sheet (NTF 8031, manufactured by Nitto Denko Corporation) having a thickness of 110 μm were interposed between the above curable resin films and pressed at 1 MPa at 180° C. for 60 minutes to obtain a composite material of a curable resin composition and a porous fluororesin. As the press machine, high temperature vacuum press (KVHC-II type) manufactured by Kitagawa Seiki Co., Ltd. was used.

<Porous Fluororesin Content Ratio>

For the composite material obtained above, the porous fluororesin content was obtained by Formula below.

Fluorine base material content ratio(%) =(mass(g) of porous fluororesin/mass(g) of above composite material)×100

<Dielectric Constant, Dielectric Loss Tangent>

A dielectric constant and a dielectric loss tangent were measured using a sample cut to approximately 2 mm width of the composite material obtained above. Specifically, dielectric constant and dielectric loss tangent, which were measured by a cavity resonator perturbation method, were obtained from an average value of three samples. As a network analyzer, E8361A manufactured by Agilent Technologies, Inc. was used, and as a cavity resonator, CP531 (10 GHz) manufactured by Kanto Electronic Application Development Co., Ltd. was used.

<External Appearance after Reflow (Adhesion with Copper Foil)>

The surface of the PET film subjected to releasing treatment was coated with the above curable resin composition to a thickness of 50 μm, and the solvent was dried (80° C.×5 minutes) to obtain a curable resin film. Subsequently, the curable resin film was laminated to both surfaces of the porous fluororesin sheet (the same as above) having a thickness of 100 μm and temporary adhesion (80° C.×10 min, 15 kg/cm²) was performed. Thereafter, copper foil further adhered thereon, and main adhesion (170° C.×60 minutes, 30 kg/cm²) was performed to obtain a copper-clad laminate.

The obtained copper-clad laminate was cut into strips of 1.5 cm×15 cm and subjected to a reflow test. Specifically, a moisture absorption reflow test corresponding to JEDEC LEVEL 3 was performed at N is 5, and it was evaluated by whether detachment occurred or not. Cases where no detachment was found in any of 5 samples were judged as acceptable (O), and cases where detachment occurred even with 1 sample were judged as failed (X).

TABLE 1

|  |  | Example 1 | Example 2 | Example 3 | Example 4 | Example 5 | Example 6 | Example 7 | Comparative example 1 | Comparative example 2 |
|---|---|---|---|---|---|---|---|---|---|---|
| Bismaleimide compound | Compound 1 | 100 | — | — | — | — | — | — | — | — |
|  | Compound 2 | — | 100 | — | — | — | — | — | — | — |
|  | Compound 3 | — | — | 100 | — | — | — | — | — | — |
|  | Compound 4 (synthesis example 1) | — | — | — | 100 | — | — | — | — | — |
|  | Compound 5 (synthesis example 2) | — | — | — | — | 100 | — | — | — | — |
|  | Compound 6 (synthesis example 3) | — | — | — | — | — | 100 | — | — | — |
|  | Compound 7 (synthesis example 4) | — | — | — | — | — | — | 100 | — | — |
|  | Compound 8 (comparative synthesis example 1) | — | — | — | — | — | — | — | 100 | — |
|  | Compound 9 (comparative synthesis example 2) | — | — | — | — | — | — | — | — | 100 |

TABLE 1-continued

|  |  | Example 1 | Example 2 | Example 3 | Example 4 | Example 5 | Example 6 | Example 7 | Comparative example 1 | Comparative example 2 |
|---|---|---|---|---|---|---|---|---|---|---|
| Polymerization initiator | Dicumyl peroxide | 2 | 2 | 2 | 2 | 2 | 2 | 2 | 2 | 2 |
| Organic solvent | Toluene | 120 | 120 | 120 | 120 | 120 | 120 | 120 | 120 | 120 |
| Carbon number of main chain of hydrocarbon group X |  | 18 | 18 | 18 | 16 | 16 | 11 | 30 | 8 | 35 |
| Proportion of compound with n = 0 in bismaleimide compounds (peak area ratio by GPC, n = 0/n ≥ 0) |  | 14 | 24 | 9 | 6 | 29 | 14 | 14 | 14 | 14 |
| Proportion of compound with n = 0 and compound with n = 1 in bismaleimide compounds (peak area ratio by GPC, n = 0 + n = 1/n ≥ 0) |  | 24 | 25 | 20 | 16 | 30 | 24 | 24 | 24 | 24 |
| Content of porous fluororesin (wt %) |  | 78 | 78 | 78 | 78 | 78 | 78 | 78 | 78 | 78 |
| Dielectric constant |  | 2.25 | 2.45 | 2.12 | 2.2 | 2.43 | 2.41 | 2.1 | 2.7 | 2.2 |
| Dielectric loss tangent |  | 0.0008 | 0.0025 | 0.0006 | 0.001 | 0.0021 | 0.0028 | 0.0005 | 0.003 | 0.0006 |
| External appearance after reflow |  | ○ | ○ | ○ | ○ | ○ | ○ | ○ | ○ | X |

From the above results, since the composite material of the present invention combines the base material made of the porous fluororesin and a specific bismaleimide compound, the dielectric constant can be suppressed to 2.5 or less, and the dielectric loss tangent can be suppressed to 0.0028 or less. Similarly, it was confirmed that relative dielectric constant and dielectric loss tangent were greatly reduced as compared with the high-frequency circuit board in the related art.

This seems to be due to that the porous fluororesin alone used in the examples has a low relative dielectric constant of 2.1 and a low dielectric loss tangent of 0.0002 at 10 GHz. That is, when the solvent-diluted bismaleimide compound is impregnated in the porous fluororesin and dried and cured by applying heat and pressure, the bismaleimide compound is incorporated into the pores of the fluororesin and the ratio of the porous fluororesin of the composite material is increased so that the excellent dielectric properties of the porous fluororesin were reflected in the dielectric properties of the composite material obtained by combining the porous fluororesin and the bismaleimide compound.

In Comparative Example 1, the dielectric constant and the dielectric loss tangent were higher as compared with the Examples. It is considered that this is due to the short main chain of the hydrocarbon group X of the bismaleimide compound.

In Comparative Example 2, the appearance after reflow was not excellent. It is considered that the reason why appearance problem occurred is because of the poor heat resistance caused by the long main chain of the hydrocarbon group X of the bismaleimide compound and low Tg.

As described above, since the curable resin composition of the present invention and the composite material obtained therefrom exhibited excellent heat resistance, low dielectric constant, and low dielectric loss tangent, it was confirmed that the curable resin composition and the composite material of the present invention are suitable for use in the electronic circuit board or the like.

REFERENCE SIGNS LIST

1 Pattern made of copper foil circuit
1a Ground circuit
1b Signal circuit
2 Cured resin impregnated material
3 Cover lay
4 Interlayer connecting material
5 Insulating layer
6 Shield layer
7 Adhesive layer
8 Electromagnetic wave shielding film
9 Shielded printed wiring board

The invention claimed is:

1. A resin impregnated material obtained by impregnating a base material with a curable resin composition,
wherein the curable resin composition contains a bismaleimide compound (A) represented by General Formula (I) and a radical polymerization initiator (B), and the base material is made of a porous fluororesin,

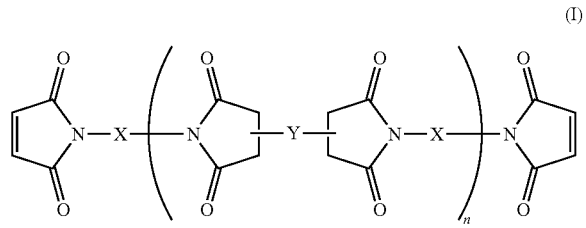

(I)

in Formula (I), X represents an aliphatic, alicyclic, or aromatic hydrocarbon group having 10 to 30 carbon atoms in the main chain, and these group optionally have a hetero atom, a substituent, or a siloxane skeleton, Y represents an aliphatic, alicyclic, or aromatic hydrocarbon group, and these groups optionally have a hetero atom, a substituent, a phenyl ether skeleton, a sulfonyl skeleton, or a siloxane skeleton, and n represents a number in the range of 1 to 20,
wherein the bismaleimide compound represented by General Formula (I) is a mixture of compounds in which n in General Formula (I) is any number in the range of 1 to 20, and a proportion of a compound in which n is 0 in the mixture is 5% to 30% by mass.

2. The resin impregnated material according to claim 1, wherein the radical polymerization initiator (B) is one or two or more selected from a peroxide-based polymerization initiator, a diazo-based polymerization initiator, an alkylphenone-based polymerization initiator, an acylphosphine-based polymerization initiator, a titanocene-based polymerization initiator, and an oxime ester-based polymerization initiator.

3. The resin impregnated material according to claim 1, wherein the content ratio of the porous fluororesin in resin impregnated material is 20% to 90% by mass.

4. A method of manufacturing a copper-clad laminate comprising:
   a step of semi-curing the resin impregnated material according to claim 1 to B stage state;
   a step of obtaining a semi-cured laminate by laminating the semi-cured resin impregnated material and copper foil; and
   a step of curing the semi-cured laminate by heating and/or energy ray irradiation to obtain the copper-clad laminate.

5. A composite material comprising:
   a polymer of a bismaleimide compound represented by General Formula (I); and
   a porous fluororesin,
   wherein the bismaleimide compound represented by General Formula (I) is a mixture of compounds in which n in General Formula (I) is any number in the range of 1 to 20, and, a proportion of a compound in which n is 0 in the mixture is 5% to 30% by mass,

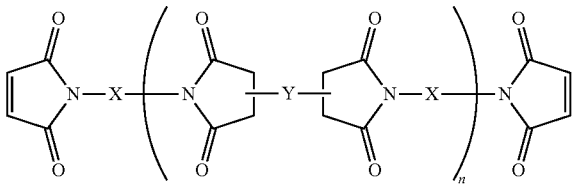

in Formula (I), X represents an aliphatic, alicyclic, or aromatic hydrocarbon group having 10 to 30 carbon atoms in a main chain, and these groups optionally have a hetero atom, a substituent, or a siloxane skeleton, Y represents an aliphatic, alicyclic, or aromatic hydrocarbon group, and these groups optionally have a hetero atom, a substituent, a phenyl ether skeleton, a sulfonyl skeleton, or a siloxane skeleton, and n represents a number in the range of 1 to 20.

6. The composite material according to claim 5, wherein the content ratio of the porous fluororesin in composite material is 20% to 90% by mass.

7. A copper-clad laminate comprising:
   copper foil that is laminated on the composite material according to claim 5.

* * * * *